(12) United States Patent
Kim et al.

(10) Patent No.: US 11,954,595 B2
(45) Date of Patent: Apr. 9, 2024

(54) ELECTRONIC DEVICE FOR RECOGNIZING OBJECT IN IMAGE, AND OPERATION METHOD THEREOF

(71) Applicant: SAMSUNG ELECTRONICS CO., LTD., Suwon-si (KR)

(72) Inventors: Yehoon Kim, Suwon-si (KR); Chanwon Seo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 304 days.

(21) Appl. No.: 17/416,041

(22) PCT Filed: Aug. 16, 2019

(86) PCT No.: PCT/KR2019/010427
§ 371 (c)(1),
(2) Date: Jun. 18, 2021

(87) PCT Pub. No.: WO2020/130274
PCT Pub. Date: Jun. 25, 2020

(65) Prior Publication Data
US 2022/0067368 A1    Mar. 3, 2022

(30) Foreign Application Priority Data

Dec. 20, 2018 (KR) .......................... 10-2018-0166406

(51) Int. Cl.
*G06N 3/00* (2023.01)
*G06N 3/02* (2006.01)
(Continued)

(52) U.S. Cl.
CPC ................. *G06N 3/08* (2013.01); *G06N 3/02* (2013.01); *G06V 10/255* (2022.01);
(Continued)

(58) Field of Classification Search
CPC ............ G06N 3/08; G06N 3/02; G06V 10/82; G06V 20/10; G06V 10/255; G06V 10/774; G06V 10/764; G06V 40/103
See application file for complete search history.

(56) References Cited

U.S. PATENT DOCUMENTS 9,396,412 B2    7/2016    Kuo et al.
9,436,895 B1    9/2016    Jones et al.
(Continued)

FOREIGN PATENT DOCUMENTS

JP        4695275 B2        6/2011
JP        2017-49676 A      3/2017
(Continued)

OTHER PUBLICATIONS

Communication dated Dec. 10, 2021, issued by the European Patent Office in European Application No. 19899784.3.
(Continued)

*Primary Examiner* — Manav Seth
(74) *Attorney, Agent, or Firm* — Sughrue Mion, PLLC

(57) ABSTRACT

Provided is a method, performed by an electronic device, of recognizing an object included in an image, the method including: extracting first object information from a first object included in a first image, obtaining a learning model for generating an image including a second object from the first object information, generating a second image including the second object by inputting the first object information to the learning model, comparing the first image with the second image, and recognizing the first object as the second object in the first image, based on a result of the comparing.

17 Claims, 10 Drawing Sheets

(51) Int. Cl.

| | | |
|---|---|---|
| *G06N 3/08* | (2023.01) | |
| *G06V 10/20* | (2022.01) | |
| *G06V 10/764* | (2022.01) | |
| *G06V 10/774* | (2022.01) | |
| *G06V 10/82* | (2022.01) | |
| *G06V 20/10* | (2022.01) | |
| *G06V 40/10* | (2022.01) | |

(52) U.S. Cl.
CPC .......... *G06V 10/764* (2022.01); *G06V 10/774* (2022.01); *G06V 10/82* (2022.01); *G06V 20/10* (2022.01); *G06V 40/103* (2022.01)

(56) References Cited

U.S. PATENT DOCUMENTS

| | | | |
|---|---|---|---|
| 9,633,044 B2 | 4/2017 | Kim et al. | |
| 10,096,143 B2 * | 10/2018 | Nam | A63F 13/825 |
| 10,326,928 B2 * | 6/2019 | Jeong | G06T 7/11 |
| 10,540,757 B1 * | 1/2020 | Bouhnik | G06T 7/37 |
| 10,977,873 B2 * | 4/2021 | Lee | G06T 11/001 |
| 11,042,728 B2 * | 6/2021 | Han | G06V 10/82 |
| 11,367,239 B2 * | 6/2022 | Shysheya | G06N 3/006 |
| 11,521,095 B2 * | 12/2022 | Wang | G06N 3/045 |
| 11,699,213 B2 * | 7/2023 | Ban | G06T 7/70 382/156 |
| 11,710,347 B2 * | 7/2023 | Kawase | G06V 40/172 382/118 |
| 11,741,668 B2 * | 8/2023 | Jones | G06N 3/045 345/423 |
| 11,743,585 B2 * | 8/2023 | Jung | H04N 23/675 348/208.4 |
| 2012/0163670 A1 | 6/2012 | Eaton et al. | |
| 2015/0278607 A1 | 10/2015 | Saptharishi et al. | |
| 2018/0204093 A1 | 7/2018 | Zhu et al. | |
| 2018/0253596 A1 * | 9/2018 | Barman | G06V 10/147 |
| 2018/0268201 A1 * | 9/2018 | Yu | G06V 10/82 |

FOREIGN PATENT DOCUMENTS

| | | |
|---|---|---|
| JP | 2017-182633 A | 10/2017 |
| KR | 10-2018-0069588 A | 6/2018 |

OTHER PUBLICATIONS

Yin et al., "Learning to Generate and Edit Hairstyles," Proceedings of the 25th ACM International Conference on Multimedia, ACMPUB2, Oct. 23, 2017, pp. 1627-1635, XP058620090.

Li et al., "A Unified Generative Adversarial Framework for Image Generation and Person Re-identification," Multimedia, ACM, Oct. 15, 2018, pp. 163-172, XP058544074.

Suruliandi Andavar, et al., "Person re-identification based on pose angle estimation and multi-feature extraction", 2018, The Institution of Engineering and Technology, IET Biom., 2018, vol. 7 Issue 4, 6 pages total.

Caroline Chan, et al., "Everybody Dance Now", arXiv:1808.07371, Aug. 2018, 9 pages total.

Halin Shi, et al., "Embedding Deep Metric for Person Re-identification: A Study Against Large Variations", Computer Vision—ECCV 2016. , vol. 99052016, 17 pages total.

Caroline Chan, et al., "Everybody Dance Now", 2019, arXiv:1808.07371v2, Aug. 2019, 12 pages total.

Caroline Chan, et al., "Everybody Dance Now", Aug. 2018, 3 pages total, https://www.youtube.com/watch?v=PCBTZh41Ris.

Burga Tekin, et al., "Fusing 2D Uncertainty and 3D Cues for Monocular Body Pose Estimation", arXiv:1611.05708v1, Nov. 2016 11 pages total.

Liqian Ma, et al., "Pose Guided Person Image Generation", 2017, 31st Conference on Neural Information Processing Systems, 11 pages total.

Prutha Date, et al., "Fashioning with Networks: Neural Style Transfer to Design Clothes", ML4Fasion 2017, Aug. 14, 2017, 8 pages total.

International Search Report (PCT/ISA/210) dated Nov. 25, 2019 issued by the International Search Authority in counterpart International Application No. PCT/KR2019/010427.

Written Opinion (PCT/ISA/237) dated Nov. 25, 2019 issued by the International Search Authority in counterpart International Application No. PCT/KR2019/010427.

Isola et al., "Image-to-Image Translation with Conditional Adversarial Networks", 2017 IEEE Conference on Computer Vision and Pattern Recognition, 2017, Nov. 22, 2017, 10 total pages, arXiv:1611.07004v2.

Communication dated Aug. 28, 2023, issued by Korean Intellectual Property Office in Korean Paten Application No. 10-2018-0166406.

Communication dated Nov. 16, 2023, issued by the European Patent Office in European Application No. 19899784.3.

* cited by examiner

ELECTRONIC DEVICE FOR RECOGNIZING OBJECT IN IMAGE, AND OPERATION METHOD THEREOF

TECHNICAL FIELD

The disclosure relates to an electronic device for recognizing an object in an image, and an operation method thereof.

BACKGROUND ART

In various fields, technology for identifying a person from an image captured by various photographing devices including a camera is used. For example, there are an entrance security system of comparing a person photographed by a camera with a pre-stored image to identify the person and then approving the person's entrance according to the result of the identifying, a system of comparing a suspect appearing in a captured image with a pre-stored image to identify the suspect, and a system of performing user authentication through a captured image.

However, an outward appearance, such as a pose, clothes, a hairstyle, etc., of a person appearing in a captured image may change according to various factors, such as the passage of time, changes of surroundings, etc. Although a person appearing in a currently captured image is identical to a person included in an image stored in advance for person identification in images, it may fail to correctly identify the person appearing in the image due to a difference in outward appearances.

Accordingly, technology capable of identifying a person appearing in an image with high accuracy even when the outward appearance of the person changes is needed.

DESCRIPTION OF EMBODIMENTS

Solution to Problem

To overcome the above-described problem, the disclosure is directed to providing an electronic device of recognizing an object in an image, and an operation method thereof.

Also, the disclosure is directed to providing a computer program product including a computer-readable recording medium storing a program for executing the method on a computer. It should be noted that technical objects of the present embodiments are not limited to the above-described technical objects, and other technical objects will be apparent to those skilled in the art from the following embodiments.

MODE OF DISCLOSURE

Figure 1:
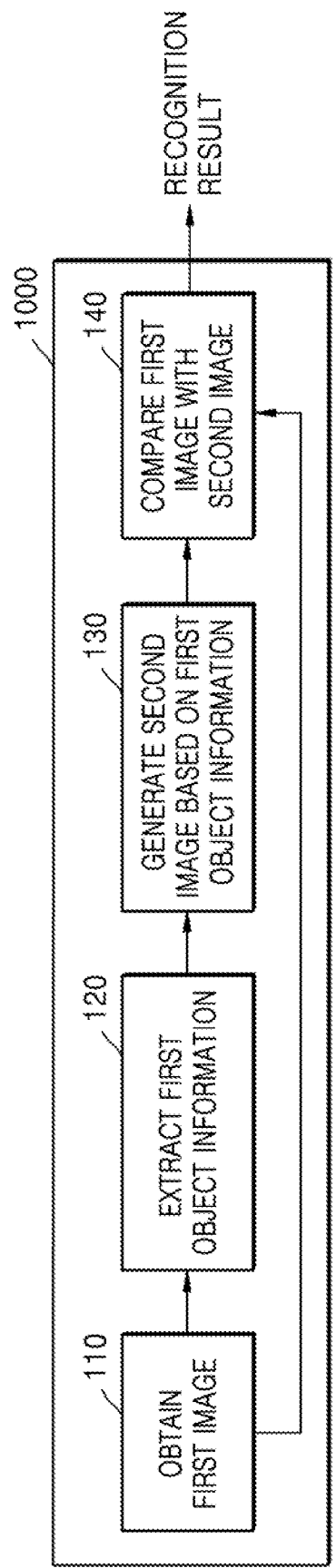
FIG. 1 is a block diagram illustrating a method of recognizing an object in an image, according to an embodiment.

As technical means for achieving the above-described technical objects, according to a first aspect of the disclosure, there is provided a method, performed by an electronic device, of recognizing an object included in an image, the method including: extracting first object information from a first object included in a first image, obtaining a learning model for generating an image including a second object from the first object information, generating a second image including the second object by inputting the first object information to the learning model, comparing the first image with the second image, and recognizing the first object as the second object in the first image, based on a result of the comparing.

Also, according to a second aspect of the disclosure, there is provided an electronic device of recognizing an object included in an image, the electronic device including: a memory storing a first image and a learning model; at least one processor configured to extract first object information from a first object included in the first image, obtain the learning model for generating an image including a second object from the first object information, generate a second image including the second object by inputting the first object information to the learning model, compare the first image with the second image, and recognize the first object as the second object in the first image, based on a result of the comparing; and an outputter configured to output a recognition result about the second object recognized in the first image.

Also, according to a third aspect of the disclosure, there is provided a computer program product including a recording medium storing a program for performing the method according to the first aspect or the second aspect.

Hereinafter, embodiments of the disclosure will be described in detail with reference to the accompanying drawings so that the disclosure may be readily implemented by those skilled in the art. However, the disclosure is not limited to these embodiments of the disclosure, and may be embodied in various other forms. Also, for definite descriptions of the disclosure, portions irrelevant to descriptions are not shown in the drawings, and throughout the specification, similar components are assigned similar reference numerals.

In this specification, it will be understood that the case in which a certain portion is "connected" to another portion includes the case in which the portion is "electrically connected" to the other portion with another device in between, as well as the case in which the portion is "directly connected" to the other portion. Also, it will be understood that when a certain portion "includes" a certain component, the portion does not exclude another component but can further include another component, unless the context clearly dictates otherwise.

A function related to artificial intelligence, according to the disclosure, may operate through a processor and a memory. The processor may be configured with a single processor or a plurality of processors. The single processor or each of the plurality of processors may be a general-purpose processor (for example, a central processing unit (CPU), an application processor (AP), and a digital signal processor (DSP)), a graphics-dedicated processor (for example, a graphics processing unit (GPU) and a vision processing unit (VPU)), or an artificial intelligence-dedicated processor (for example, a neural processing unit (NPU)). The single processor or the plurality of processors may perform a control operation of processing input data according to a predefined operation rule or artificial intelligence model stored in advance in the memory. Also, when the single processor or each of the plurality of processors is an artificial intelligence-dedicated processor, the artificial intelligence-dedicated processor may be designed as a specialized hardware structure for processing a predefined artificial intelligence model.

The predefined operation rule or artificial intelligence model may be created through training. Creating the predefined operation rule or artificial intelligence model through training means creating a predefined operation rule or artificial intelligent model set to perform a desired characteristic (or a purpose) when a basic artificial intelligence model is trained with a plurality of pieces of training data by a learning algorithm. The training may be performed by an apparatus of performing artificial intelligence according to the disclosure or by a separate server and/or system. The learning algorithm may be supervised learning, unsupervised learning, semi-supervised learning, or reinforcement learning, although not limited to the above-mentioned examples.

The artificial intelligence model may be configured with a plurality of neural network layers. Each of the plurality of neural network layers may have a plurality of weights, and perform a neural network arithmetic operation through an arithmetic operation between an arithmetic operation result of a previous layer and the plurality of weights. The plurality of weights of the plurality of neural network layers may be optimized by a training result of the artificial intelligence model. For example, the plurality of weights may be updated such that a loss value or a cost value obtained by the artificial intelligence model during a training process is reduced or minimized. An artificial neural network may include a deep neural network (DNN), and the artificial neural network may be, for example, a convolutional neural network (CNN), a deep neural network (DNN), a recurrent neural network (RNN), a restricted boltzmann machine (RBM), a deep belief network (DBN), a bidirectional recurrent deep neural network (BRDNN), or Deep Q-Networks, although not limited to the above-mentioned examples.

Hereinafter, the disclosure will be described in detail with reference to the accompanying drawings.

FIG. 1 is a block diagram illustrating a method of recognizing an object in an image, according to an embodiment.

According to an embodiment, an electronic device 100 of recognizing an object in an image may recognize an object included in an image by using pre-stored data about the object. According to an embodiment, an object that can be recognized by the electronic device 1000 may be a specific object decided in advance. Also, the electronic device 1000 may perform operations 110 to 140 illustrated in FIG. 1 to output a recognition result of an object in an image.

According to an embodiment, the pre-stored data about the object may include a learning model trained in advance for the object. According to an embodiment, the learning model may be trained based on at least one of at least one source image including the object and information extracted from the at least one source image.

According to an embodiment, the electronic device 1000 may generate a new image including the object to be recognized by using the learning model. The electronic device 1000 may recognize the object in the image by using the new image.

According to an embodiment, an object which may be recognized from an image may include animals/plants, machines, structures, etc. of which outward appearances may change, as well as persons. However, an object which may be recognized from an image is not limited to the above-mentioned examples, and various kinds of objects of which outward appearances may change according to various conditions may be recognized from an image, according to an embodiment.

The electronic device 1000 according to an embodiment may be implemented as one of various devices, such as a smart television (TV), a set-top box, a cellular phone, a smart phone, a tablet personal computer (PC), a digital camera, a laptop computer, a desktop computer, an e-book terminal, a digital broadcasting terminal, personal digital assistants (PDA), a portable multimedia player (PMP), a navigation system, a MP3 player, a wearable device, etc. However, the electronic device 1000 according to an embodiment is not limited to the above-mentioned examples, and may be implemented as one of other various kinds of electronic devices.

Referring to FIG. 1, the electronic device 1000 may obtain a first image including a first object, in operation 110. According to an embodiment, the first object may be an object included in the first image, and a second object may represent an object that needs to be recognized from the first image. The second object may be a specific object decided in advance, before a method of recognizing an object in an image, according to an embodiment, is performed.

The electronic device 1000 according to an embodiment may determine whether the first object included in the first image corresponds to the second object to thereby recognize the first object as the second object in the first image. According to an embodiment, the electronic device 1000 may recognize the second object in the first image by using a learning model trained for the second object to be recognized.

According to an embodiment, an 'image' to be processed may include a partial or full screen that can be displayed on a display device. In the present specification, for convenience of description, the term 'image' is collectively used, however, an 'image' which will be described below may include a screen, such as a user interface or a web page, which can be displayed, as well as a picture or video as its original meaning.

The first image according to an embodiment may include various kinds of images, such as a two-dimension (2D) image, a three-dimension (3D) image, etc., photographed by various methods. Also, the first image may be an image photographed by a photographing device included in the electronic device 1000, although not limited thereto. However, the first image may be an image received from an external device (not shown). However, the first image is not limited to the above-mentioned examples, and may be an image obtained by the electronic device 1000 through various methods.

According to an embodiment, the electronic device 1000 may perform pre-processing for performing object recognition on an image obtained by such various methods, thereby obtaining the first image. For example, the electronic device

1000 may determine an area to be processed to recognize an object from an image, and obtain an image of the determined area as the first image. For example, the electronic device 1000 may obtain, after deleting a background area from an image, an image of the remaining area, as the first image. Also, when a plurality of objects are included in an image, the electronic device 1000 may obtain an image of an area including one of the plurality of objects, as the first image.

In operation 120, the electronic device 1000 may extract first object information from the first object included in the first image. The first object information according to an embodiment may include information about an outward appearance of the first object, which may change according to various conditions. Information about an outward appearance of an object may include information about a state, structure, color, pose, etc. of the object, which may change to various shapes.

According to an embodiment, when the first object is a person or animal, the electronic device 1000 may extract at least one of pose information and style information, which is information about a changeable outward appearance of the first object, as the first object information of the first image.

The pose information may include information about an outward appearance of the first object, which may change by various motions of the first object. For example, the pose information may include information about skeleton properties obtained by skeleton analysis technology. The information about the skeleton properties may include a group of skeleton lines generated based on key points representing joint parts. However, the pose information is not limited to the above-described example, and the pose information may include information about poses of the first object, obtained by various methods.

The style information may include information about clothes, accessories, shoes, a hat, a hairstyle, etc., which the first object wears or has.

According to an embodiment, when the first object is a structure of which a shape is changeable, the electronic device 1000 may extract information about shapes of the changeable structure as the first object information. The information about the shapes of the changeable structure may be obtained by a method that is similar to the above-described method of obtaining pose information.

However, the first object information of the first object according to an embodiment is not limited to the above-described example, and the information about the changeable outward appearance of the first object may include various kinds of information that is extractable from the first image by various methods.

In operation 130, the electronic device 1000 may generate a second image based on the first object information extracted in operation 120. The second image may include a second object that needs to be recognized from the first image. The electronic device 1000 may determine whether the first object of the first image is identical to the second object, to thereby recognize the second object from the first image, according to an embodiment.

The second image according to an embodiment may be newly generated based on the first object information extracted in operation 120 and pre-stored data about the second object, independently from the first image obtained in operation 110. For example, the second image may include the second object having an outward appearance corresponding to the first object information.

The pre-stored data may include a machine-learning algorithm for generating an image including the second object by using the first object information as an input value. According to an embodiment, the second image may be generated by inputting the first object information to the machine-learning algorithm for the second object.

For example, the pre-stored data may be a generative model which is a learning model capable of generating a new image by using the first object information as an input value, and the pre-stored data may be, for example, a generative adversarial network (GAN).

A learning model that is used to generate the second image, according to an embodiment, may be generated by training at least one image including the second object having various outward appearances and object information corresponding to the at least one image. For example, the learning model may be generated by training at least one image including the second object and pose information and style information of the second object corresponding to the at least one image.

According to an embodiment, there may be different learning models generated for individual objects. For example, there may be a learning model for a first person, generated by training an image of the first person and object information corresponding to the image. Also, there may be a learning model for a second person, generated by training an image of the second person and object information corresponding to the image. Accordingly, the electronic device 1000 may use a learning model for an object that needs to be recognized to recognize the object in the first image.

The pre-stored data is not limited to the above-described example, and include various kinds of data that can generate a new second image including the second object based on the first object information extracted from the first object of the first image.

Accordingly, the second image generated according to an embodiment may include the second object having an outward appearance corresponding to the first object information extracted in operation 120. The electronic device 1000 may recognize an object in an image in consideration of information about an outward appearance of the object included in the image, by using the second image including the second object having an outward appearance corresponding to the first object information.

Also, the pre-stored data may be data stored in advance in the electronic device 1000 or data received from outside and stored in the electronic device 1000 before an operation for recognizing an object in an image according to an embodiment is performed. For example, data generated by training at least one image including the second object may have been stored in advance in the electronic device 1000 before an operation for recognizing an object in an image according to an embodiment is performed.

In operation 140, the electronic device 1000 may compare the first image obtained in operation 110 with the second image generated in operation 130. For example, the electronic device 1000 may compare the first image with the second image by extracting one or more pieces of feature information of the first object and the second object respectively included in the first and second images and determining a similarity between the pieces of feature information.

For example, a feature value may be a value for determining whether objects of two images are identical to each other, and the feature value may include various kinds of values representing features of an object, such as a skeleton, a height, a body type, etc.

Because the second image is an image generated based on the first object information of the first image, which is information about a changeable outward appearance, the second image may include the second object to which the information about the changeable outward appearance in the first image is reflected. Therefore, there may be little a difference between object information of the first image and object information of the second image. Accordingly, the electronic device 1000 may recognize the second object in the first image in consideration of object information which is information about a changeable outward appearance, by using the second image.

According to an embodiment, when a similarity between the first image and the second image, as a result of comparing between feature values of the first and second images, is greater than or equal to a reference value, the electronic device 1000 may determine that the first object included in the first image is identical to the second object that needs to be recognized according to an embodiment.

Figure 2:
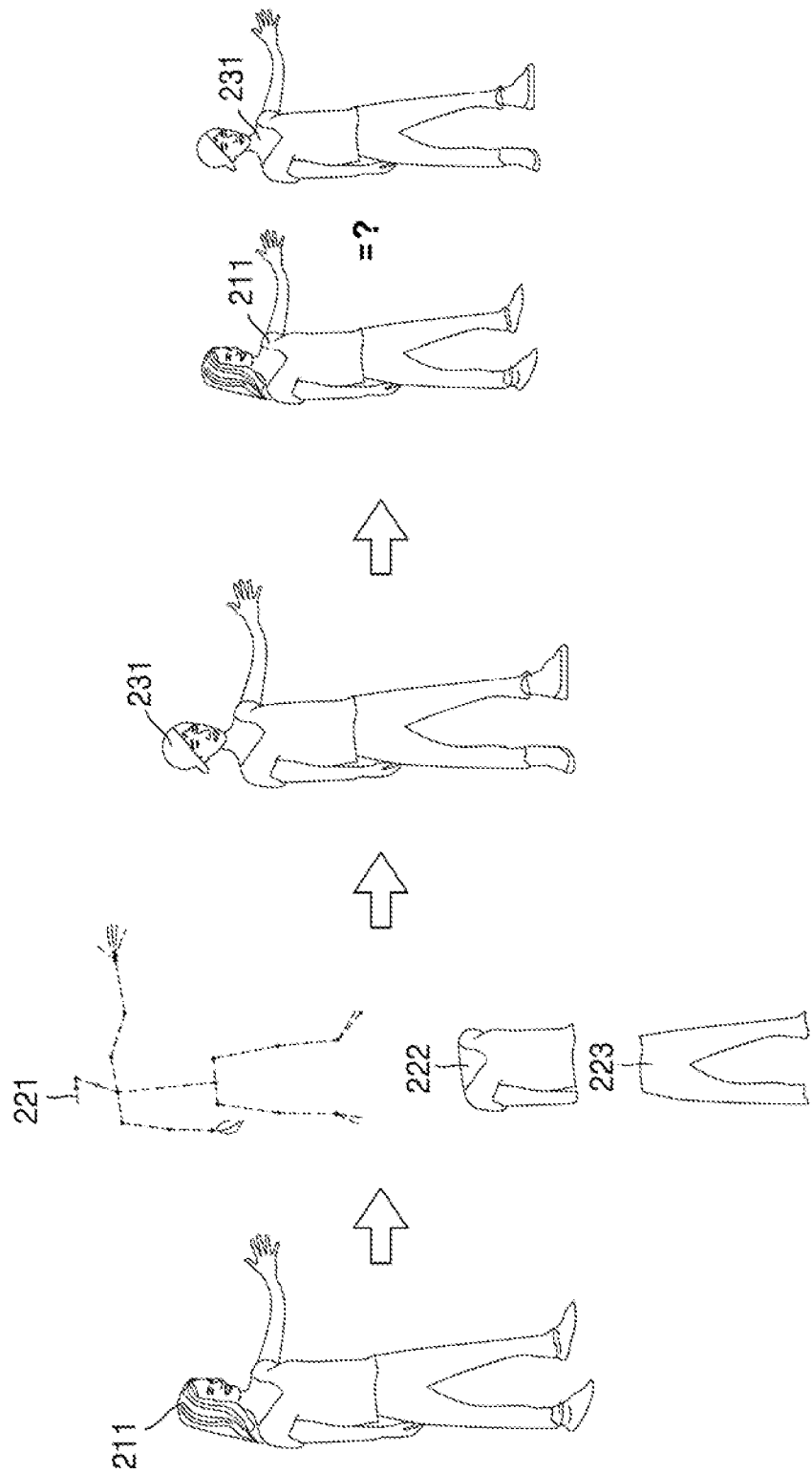
FIG. 2 illustrates examples of images that can be processed, in a method of recognizing an object in an image, according to an embodiment.

FIG. 2 illustrates examples of images that can be processed, in a method of recognizing an object in an image, according to an embodiment.

Images illustrated in FIG. 2 may correspond to operations illustrated in FIG. 1. An image 211 of FIG. 2 may correspond to operation 110 of FIG. 1. Images 221, 222, and 223 of FIG. 2 may correspond to operation 120 of FIG. 1. An image 231 of FIG. 2 may correspond to operation 130 of FIG. 1. Comparison between Images 211 and 231 of FIG. 2 may correspond to operation 140 of FIG. 1.

The image 211 of FIG. 2 illustrates an example of the first image that may be obtained by the electronic device 1000 in operation 110 of FIG. 1. The electronic device 1000 according to an embodiment may determine whether the first person included in the first image is identical to the second person.

The images 221, 222, and 223 of FIG. 2 may illustrate examples of the object information extracted in operation 120 of FIG. 1. The image 221 may be an example of pose information, and illustrate a group of skeleton lines obtained according to skeleton analysis technology. According to an embodiment, the pose information may include information about the group of skeleton lines illustrated in the image 221. The images 222 and 223 may be examples of style information, and illustrate clothes which a person corresponding to the image 211 wears. According to an embodiment, the style information may include information about the clothes illustrated in the images 222 and 223.

The image 231 of FIG. 2 may be an example of the second image generated in operation 130 of FIG. 1. The second image 231 may be an image including the second person and generated based on at least one piece of information of the pose information and style information illustrated in the images 221, 222, and 223. For example, the second image 231 may be an image generated according to the pose information and style information illustrated in the images 221, 222, and 223, and the second image 231 may be an image of the second person having a pose and style shown in the images 221, 222, and 223. Also, the second image 231 according to an embodiment may include the second person because the second image 231 is generated based on a learning model for the second person and object information extracted from the first image.

The first image 211 of FIG. 2 may be compared with the second image 231 of FIG. 2 in operation 140 of FIG. 1. According to an embodiment, the electronic device 1000 may extract one or more feature values of the first and second persons respectively included in the first and second images, and determine a similarity between the feature values, thereby determining a similarity between the first and second images.

Because the second image 231 may be generated based on information about a pose and style shown in the first image 211, a pose and style shown in the second image 231 may be identical or similar to the information about the pose and style shown in the first image 211. Accordingly, a difference between other feature values (for example, skeletons, heights, body types, etc.) except for the pose and style of the second image 231 may have a great influence in determining a similarity between the first and second images.

Figure 3:
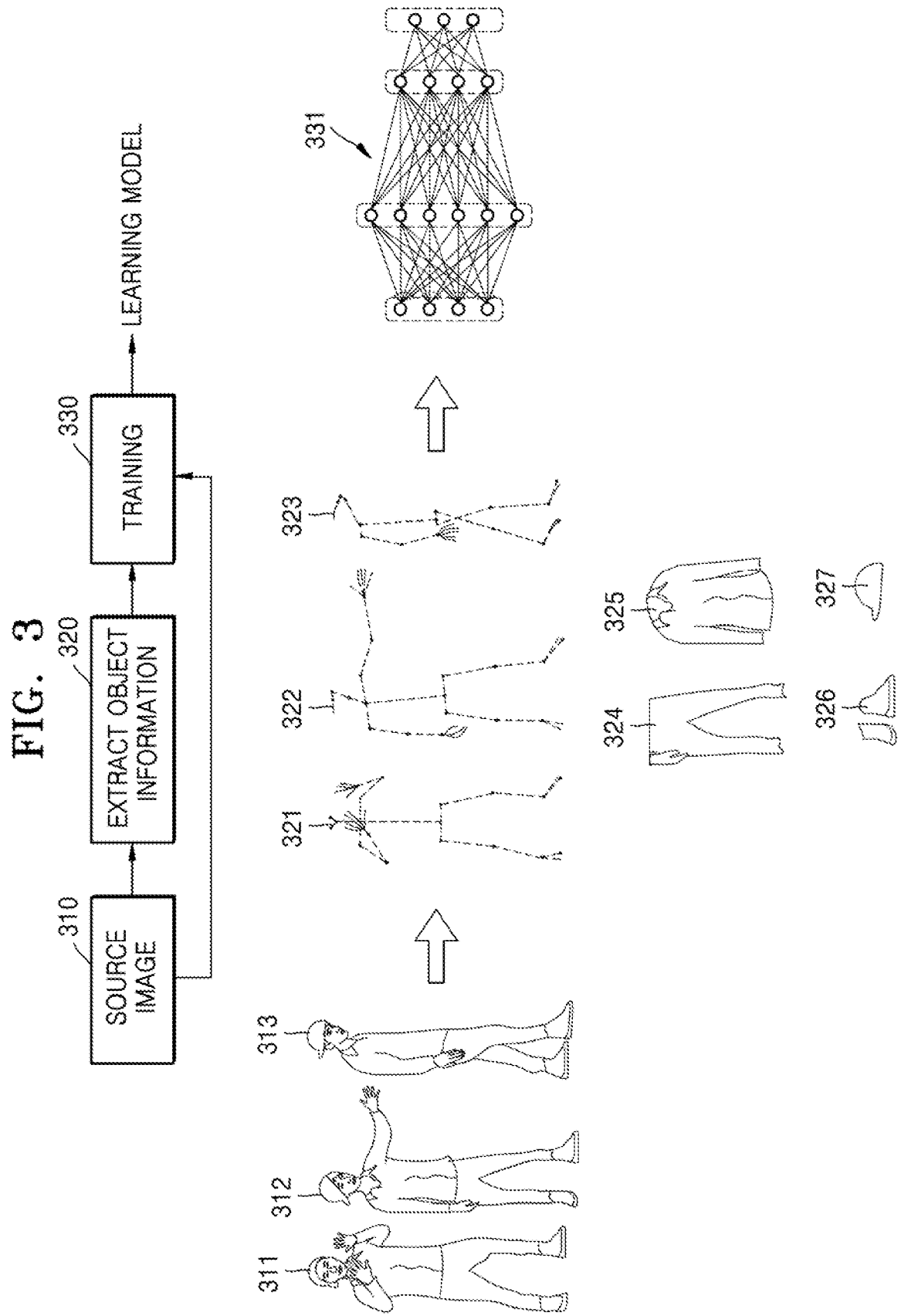
FIG. 3 is a block diagram illustrating a method of generating a learning model for generating a second image according to an embodiment.

FIG. 3 is a block diagram illustrating a method of generating a learning model for generating a second image according to an embodiment.

A learning model generated according to the method illustrated in FIG. 3 may be used to generate the second image based on the first object information in operation 130 of FIG. 1.

The method illustrated in FIG. 3 may be performed by the electronic device 1000 or an external device to generate a learning model, and the learning model may be transmitted to the electronic device 1000, although not limited thereto. However, the method illustrated in FIG. 3 may be performed by various kinds of devices, and a learning model generated as a result of the performing may be transmitted to the electronic device 1000.

Hereinafter, for convenience of description, a case in which the method of FIG. 3 is performed by the electronic device 1000 will be described. The electronic device 1000 may perform operations 310 to 330 illustrated in FIG. 3 to generate a learning model to be used to generate an image including the second object based on the first object information.

Images 311 to 331 illustrated in FIG. 3 may correspond to operations illustrated in FIG. 3. Images 311 to 313 of FIG. 3 may correspond to operation 310 of FIG. 3. Images (also, referred to as object information) 321 to 327 of FIG. 3 may correspond to operation 320 of FIG. 3. An image (also, referred to as a learning model) 331 of FIG. 3 may correspond to operation 330 of FIG. 3.

Referring to FIG. 3, in operation 310, the electronic device 1000 may obtain one or more source images 311 to 313 including the second object. The electronic device 1000 may generate a learning model for the second object based on the one or more source images 311 to 313.

The source images 311 to 313 according to an embodiment may include images obtained by photographing the second object under various conditions. For example, the source images 311 to 313 may include images obtained by photographing the second object of which a pose changes according to the passage of time. Also, the source images 311 to 313 may include images obtained by photographing the second object wearing different clothes. The source images 311 to 313 may be 2D still images although not limited thereto. However, the source images 311 to 313 may include various kinds of images, such as videos, 3D images, etc., obtained by photographing the second object.

In operation 320, the electronic device 1000 may extract the object information 321 to 327 from the one or more source images 311 to 313 obtained in operation 310. The object information 321 to 327 extracted in operation 320 may include information about an outward appearance of an object, which may change according to various causes or conditions, like the object information extracted in operation 120 of FIG. 1. For example, the object information 321 to 327 may include information about a state, structure, color, pose, etc. of an object, which may change to various forms.

Object information illustrated in the images 321 to 323 may be information about poses according to an embodiment, and may be groups of skeleton lines generated based on key points representing joint parts of an object, obtained according to skeleton analysis technology. The images 321, 322, and 323 may respectively correspond to the images 311, 312, and 313 illustrated as source images. Pose information of the object information 321 to 327 according to an embodiment may include information about the groups of skeleton lines illustrated in the images 321 to 312.

The object information 324 to 327 may be information about styles according to an embodiment, and may include information about clothes, accessories, shoes, a hat, a hairstyle, etc., which an object wears.

In operation 330, the electronic device 1000 may perform machine learning for generating the learning model 331, based on the source images 311 to 313 obtained in operation 310 and the object information 321 to 327 obtained in operation 320.

The learning model 331 which may be generated according to an embodiment may be a neural network model which uses the first object information obtained in operation 120 of FIG. 1 as an input value and outputs, as an output value, the second image including the second object and generated in operation 130 of FIG. 1. For example, the learning model 331 may be a generative model capable of generating a new image by using object information as an input value, and the learning model 331 may be a GAN.

However, the learning model 331 is not limited to the above-mentioned example, and the electronic device 1000 may generate various kinds of data that can generate a new image including an object to be recognized based on object information, by using the source images 311 to 313 obtained in operation 310 and the object information 321 to 327 obtained in operation 320.

Figure 4:
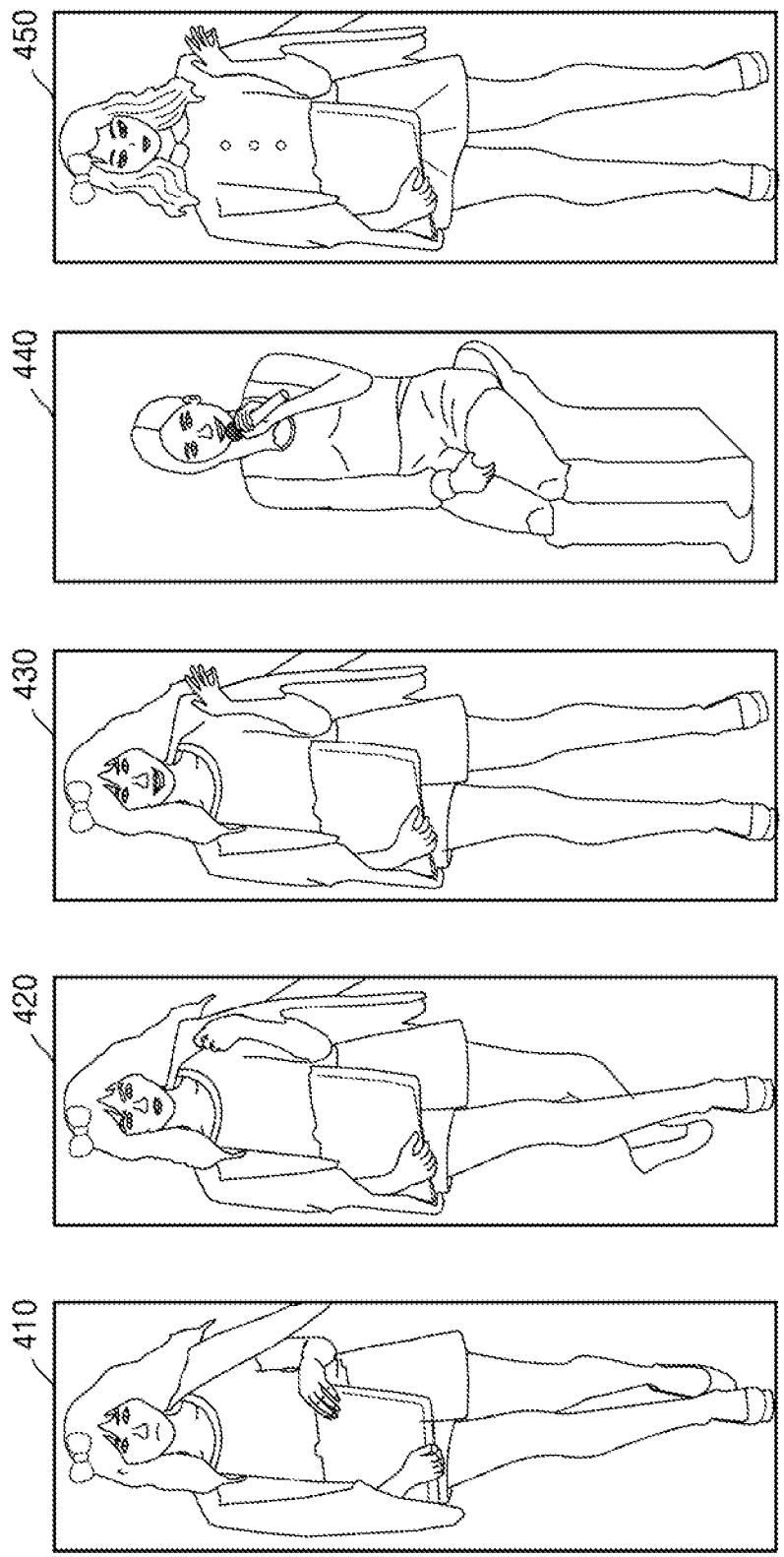
FIG. 4 illustrates examples of images obtained by photographing people, as images for recognizing an object, according to an embodiment.

FIG. 4 illustrates examples of images obtained by photographing persons, as images for recognizing an object, according to an embodiment.

Images 410 to 440 illustrated in FIG. 4 may be images obtained by photographing a first person, however, the images 410 to 440 may be different from each other in view of outward appearances, such as poses, clothes, shoes, accessories, hairstyles, etc. Also, an image 450 may be an image about a second person who is different from the first person shown in the images 410 to 440.

For example, the images 410 to 430 about the first person may have different pieces of pose information, while having the same style information, such as the same clothes, shoes, hairstyle, accessories, etc. Also, style information and pose information of the image 440 about the first person may be different from those of the other images. However, persons shown in the images 410 to 440 may be preferably recognized as the same person.

The electronic device 1000 according to an embodiment may recognize a person in an image, in consideration of information about outward appearances which may change by various factors, such as the passage of time, changes of place, etc. Accordingly, the electronic device 1000 according to an embodiment may recognize the persons shown in the images 410 to 440 as the same first person, although pose information and style information of the images 410 to 440 are different from each other.

When the electronic device 1000 recognizes the first person in the image 410, the electronic device 1000 may newly generate an image of the first person having a pose and style that are identical or similar to those of the image 410, based on pose information and style information of the image 410. Because a pose and style of the first person in the image generated by the electronic device 1000 are identical or similar to a pose and style of the person shown in the image 410, a difference between other feature values (for example, skeletons, heights, body types, etc.) except for poses and styles may have a great influence in determining a similarity between the two images. Whether the person shown in the image 410 is the first person may be determined according to the similarity between the two images.

Although the images 420 and 430 are different from the image 410 in view of poses and the image 440 is different from the image 410 in view of styles and poses, images generated by the electronic device 1000 based on pose information and style information of the images 410 to 440 may be identical or similar to the images 420 to 440 in view of poses and styles. Accordingly, differences between other feature values except for poses and styles may have a great influence in determining similarities between the generated images and the images 420 to 440.

Also, a person shown in the image 450 may be similar to the persons shown in the images 410 to 430 in view of clothes, shoes, hairstyles, accessories, etc., and also similar to the person shown in the image 430 in view of poses. However, a person included in an image generated based on pose information and style information of the person shown in the image 450 may be identical or similar to the person included in the image 430 in view of poses and styles. Accordingly, a difference between other feature values except for poses and styles may have a great influence in determining a similarity between the generated image and the image 430. Therefore, according to an embodiment, the person of the image 450 may be recognized as the second person that is different from the person of the images 410 to 440.

Figure 5:
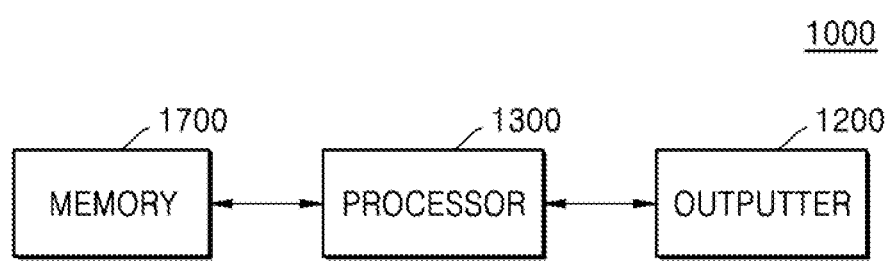
FIGS. 5 and 6 are block diagrams for describing an internal configuration of an electronic device according to an embodiment.
Figure 6:
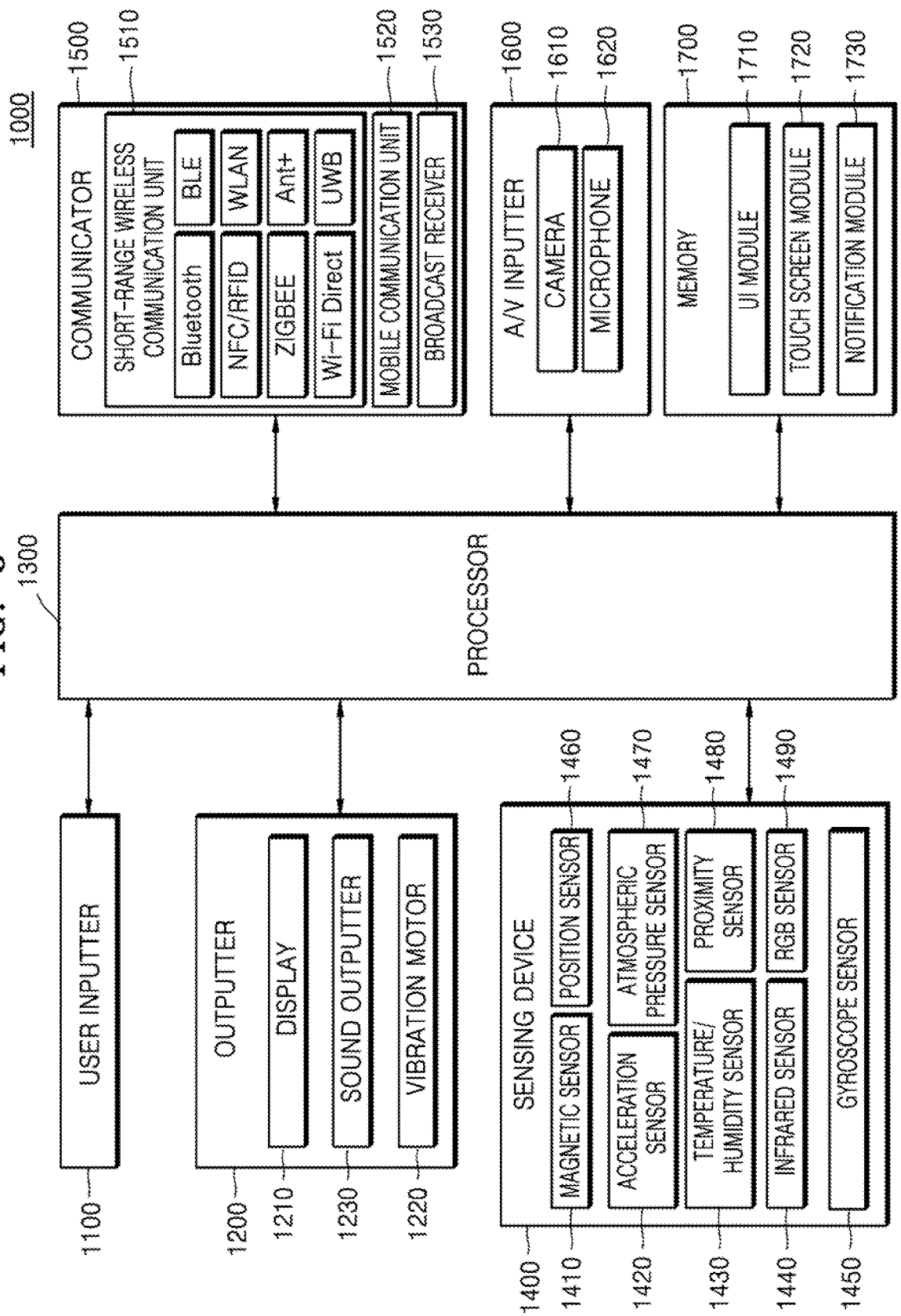

FIGS. 5 and 6 are block diagrams for describing an internal configuration of the electronic device 1000 according to an embodiment.

Referring to FIG. 5, the electronic device 1000 may include a processor 1300, a memory 1700, and an outputter 1200. However, the components shown in FIG. 5 are not essential components of the electronic device 1000. The electronic device 1000 may be implemented with more or less components than those shown in FIG. 5.

For example, as shown in FIG. 6, the electronic device 1000 according to some embodiments may further include a user inputter 1100, a sensing device 1400, an Audio/Video (NV) inputter 1600, and a memory 1700, in addition to the processor 1300, the memory 1700, and the outputter 1200.

The user inputter 1100 may be means to enable a user to input data for controlling the electronic device 1000. For example, the user inputter 1100 may be a key pad, a dome switch, a touch pad (a capacitive type, a resistive type, an infrared beam type, a surface acoustic wave type, an integral strain gauge type, a piezo effect type, etc.), a jog wheel, a jog switch, etc., although not limited thereto.

According to an embodiment, the user inputter 1100 may receive a user input for performing an operation of recognizing an object in an image. Also, according to an embodiment, the user inputter 1100 may receive a user input for performing an operation of generating a learning model based on a source image and object information of the source image.

The outputter 1200 may output audio signals, video signals, or vibration signals, and include a display 1210, a sound outputter 1220, and a vibration motor 1230.

The outputter 1200 according to an embodiment may output a result obtained by performing an operation of recognizing an object in an image to outside.

The display 1210 may display and output information processed by the electronic device 1000. According to an embodiment, the display 1210 may display an image in which an object is to be recognized. Also, the display 1210 may display a result obtained by performing an operation of recognizing an object in an image.

Meanwhile, when the display 1210 and a touch pad form a layer structure to be configured as a touch screen, the display 1210 may be used as an inputter, as well as an outputter. The display 1210 may include at least one among a liquid crystal display, a thin film transistor-liquid crystal display, a thin film transistor-liquid crystal display, an organic light-emitting diode, a flexible display, a 3D display, and an electrophoretic display. According to an implementation form of the electronic device 1000, the electronic device 1000 may include two or more displays 1210.

The sound outputter 1220 may output audio data that is received from a communication unit 1500 or stored in the memory 1700. According to an embodiment, the sound outputter 1220 may output a result obtained by performing an operation of recognizing an object in an image.

The vibration motor 1230 may output vibration signals. Also, the vibration motor 1230 may output a vibration signal when a touch is input to the touch screen. According to an embodiment, the vibration motor 1230 may output a result obtained by performing an operation of recognizing an object in an image.

The processor 1300 may control overall operations of the electronic device 1000. For example, the controller 1300 may execute programs stored in the memory 1700 to control overall operations of the user inputter 1100, the outputter 1200, the sensing device 1400, the communication unit 1500, the AN inputter 1600, etc. The electronic device 1000 may include at least one processor 1300.

The processor 1300 may be configured to perform basic arithmetic operations, logic operations, and input/output operations to process an instruction of a computer program. The instruction may be provided from the memory 1700 to the processor 1300, or received through the communicator 1500 and provided to the processor 1300. For example, the processor 1300 may be configured to execute an instruction according to a program code stored in a recording device such as a memory. The processor 1300 according to an embodiment may include at least one processor 1300.

The processor 1300 according to an embodiment may extract first object information about a first object from a first image in which an object is to be recognized, and generate a second image including a second object from the first object information by using a learning model. The second object may be a specific object decided in advance. The processor 1300 may recognize the second object in the first image based on a result of comparison between the first image and the second image.

Also, the processor 1300 may additionally extract second object information from the first object of the first image, and generate a third image from the second image based on the second object information. The second object information may include information about outward appearances of an object that may change according to various conditions, like the first object information, and may include a different kind of information from the first object information. The processor 1300 may recognize the second object in the first image based on a result of comparison between the first image and the third image.

Also, the processor 1300 may extract areas corresponding to objects from the first image and the second image, and recognize an object in the first image based on a result of comparison between feature information extracted from the individual areas. The feature information may be values for determining whether the objects of the first and second images are identical to each other, and may include various kinds of values representing features of objects, such as a skeleton, a height, a body type, etc.

The sensing device 1400 may sense a state of the electronic device 1000 or a state of surroundings of the electronic device 1000, and transfer sensed information to the processor 1300.

The sensing device 1400 may include at least one among a magnetic sensor 1410, an acceleration sensor 1420, a temperature/humidity sensor 1430, an infrared sensor 1440, a gyroscope sensor 1450, a position sensor (for example, a global positioning system (GPS)) 1460, an atmospheric pressure sensor 1470, a proximity sensor 1480, and a RGB sensor (illuminance sensor) 1490, although not limited thereto.

The sensing device 1400 according to an embodiment may be used to generate the first image in which an object is to be recognized, or a source image that is used to generate a learning model. For example, the source image or the first image according to an embodiment may be generated by a sensor, such as the infrared sensor 1440 and the RGB sensor 1490, which can generate an image by sensing an external environment, in the sensing device 1400. However, the sensing device 1400 is not limited to the above-mentioned examples, and the sensing device 1400 may obtain various kinds of images by sensing an external environment through various kinds of sensors, and use one of the obtained images as the source image or the first image according to an embodiment.

The communicator 1500 may include one or more components to enable the electronic device 1000 to communicate with a server 2000 or an external device (not shown). For example, the communicator 1500 may include a short-range wireless communication unit 1510, a mobile communication unit 1520, and a broadcast receiver 1530.

The short-range wireless communication unit 1510 may include a Bluetooth communicator, a Bluetooth low energy (BLE) communicator, a near field communication (NFC) unit, a wireless local area network (WLAN) communicator, a Zigbee communicator, an infrared data association (IrDA) communicator, a Wi-Fi Direct (WFD) communicator, an ultra wideband (UWB) communicator, an Ant+ communicator, and the like, although not limited thereto.

The mobile communication unit 1520 may transmit/receive wireless signals to/from at least one of a base station, an external terminal, or a server on a mobile communication network. The wireless signal may include a voice call signal, a video call signal or various formats of data according to transmission/reception of text/multimedia messages.

The broadcast receiver 1530 may receive broadcasting signals and/or broadcasting-related information from outside through a broadcast channel. The broadcast channel may include a satellite channel and a terrestrial channel. According to implementation examples, the electronic device 1000 may not include the broadcast receiver 1530.

According to an embodiment, the communicator 1500 may receive at least one of a first image and a learning model from outside. Also, the communicator 1500 may transmit a recognition result about an object recognized in an image according to an embodiment, to outside.

The A/V inputter 1600 may be used for input of an audio signal or a video signal, and may include a camera 1610 and a microphone 1620. The camera 1610 may acquire an image frame, such as a still image or a moving image, through an image sensor in a video call mode or a photographing mode. An image captured by the image sensor may be processed by the processor 1300 or a separate image processor (not shown).

The A/V inputter 1600 according to an embodiment may generate a first image in which an object is to be recognized or a source image that is used to generate a learning model.

The microphone 1620 may receive a sound signal from the outside and process the sound signal into electrical voice data.

The memory 1700 may store programs for processing and control of the processor 1300, and store data input to the electronic device 1000 or to be output from the electronic device 1000.

The memory 1700 according to an embodiment may store data processed in an operation of recognizing an object in an image. Also, the memory 1700 may store a first image or a source image obtained by the electronic device 1000. Also, the memory 1700 may store a learning model that is used to generate a second image. For example, the memory 1700 may have stored the learning model in advance, before an operation for recognizing an object in an image is performed, according to an embodiment.

The memory 1700 may include at least one type of storage medium among a flash memory type, a hard disk type, a multimedia card micro type, a card type memory (for example, secure digital (SD) or extreme digital (XD) memory), random access memory (RAM), static random access memory (SRAM), read only memory (ROM), electrically erasable programmable read-only memory (EEPROM), programmable read-only Memory (PROM), a magnetic memory, a magnetic disk, or an optical disk.

The programs stored in the memory 1700 may be classified into a plurality of modules according to their functions, and for example, the programs may be classified into a UI module 1710, a touch screen module 1720, a notification module 1730, etc.

The UI module 1710 may provide a specialized user interface (UI) or graphic user interface (GUI) interworking with the electronic device 1000 for each application. The touch screen module 1720 may sense a user's touch gesture made on a touch screen, and transfer information about the user's touch gesture to the processor 1300. The touch screen module 1720 according to an embodiment may recognize and analyze a touch code. The touch screen module 1720 may be configured with separate hardware including a controller.

Various sensors may be installed inside or around the touch screen to sense a touch or proximity touch made on the touch screen. An example of a sensor for sensing a touch made on the touch screen is a tactile sensor. The tactile sensor may be a sensor for sensing a contact of a specific object, which may be felt by a human. The tactile sensor may sense various information, such as roughness of a contact surface, stiffness of a contact object, temperature of a contact point, etc.

The user's touch gesture may include tap, touch & hold, double tap, drag, panning, flick, drag & drop, swipe, etc.

The notification module 1730 may generate a signal for informing event occurrence of the electronic device 1000.

Figure 7:
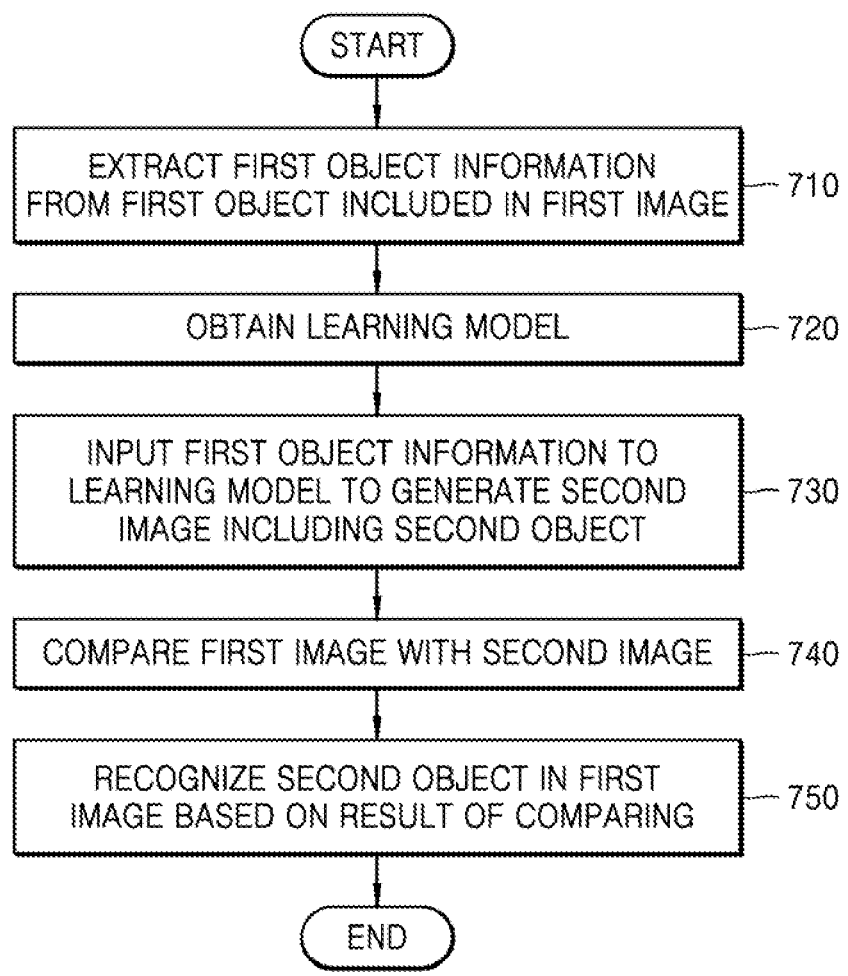
FIG. 7 is a flowchart illustrating a method of recognizing an object in an image, according to an embodiment.

FIG. 7 is a flowchart illustrating a method of recognizing an object in an image, according to an embodiment. A method of recognizing an object in an image, as illustrated in FIG. 7, may correspond to a method of recognizing an object in an image, as illustrated in FIG. 1.

Referring to FIG. 7, in operation 710, the electronic device 1000 may extract first object information from a first object included in a first image in which an object is to be recognized. The electronic device 1000 may determine whether the first object of the first image corresponds to a second object to thereby recognize the second object in the first image.

The second object according to an embodiment may be a specific object decided in advance. Also, the second object may have been determined in advance to be various kinds of objects of which outward appearances may change according to various conditions.

Also, the first image according to an embodiment may include various kinds of images photographed by various methods.

Also, the first object information according to an embodiment may include information about outward features of the first object, which may change according to various conditions. For example, the first object information may include at least one of pose information and style information of the first object, which may change to various forms.

In operation 720, the electronic device 1000 may obtain a learning model for generating an image including the second object, based on the first object information extracted in operation 710. The learning model may be generated from at least one source image including the second object, according to an embodiment, and according to an embodiment, the learning model may have been stored in advance in the electronic device 1000, before an operation of recognizing an object in an image is performed.

The learning model according to an embodiment may be a generative model that can generate a new image including the second object by using the first object information as an input value, and the learning model may be, for example, a GAN. However, the learning model is not limited to the above-mentioned example, and the learning model may include various kinds of data that can generate a new image including an object to need to be recognized based on object information. Also, a learning model may be provided for each of objects that may be recognized by the electronic device 1000, according to an embodiment.

In operation 730, the electronic device 1000 may input the first object information to the learning model to generate a second image including the second object. The second image may be an image newly generated based on the first object information, and the second image may include the second object that needs to be recognized in the first image by the electronic device 1000.

Because the second image according to an embodiment is an image generated based on the first object information, the second image may include the second object having object information that is identical or similar to the first object information. Therefore, according to an embodiment, the electronic device 1000 may recognize an object in an image, in consideration of information about changeable features of the object.

In operation 740, the electronic device 1000 may compare the first image with the second image. According to an embodiment, the electronic device 1000 may extract one or more feature values of objects included in the first and second images, and determine a similarity between the feature values, thereby determining a similarity between the first and second images.

When the first object included in the first image is different from the second object that needs to be recognized by the electronic device 1000, feature values of the first image with respect to other features (for example, a skeleton, a height, and a body type) except for features (for example, a pose and style) related to the first object information may be greatly different from feature values of the second image. The reason may be because the second image is an image generated by a model trained based on an image including the second object that needs to be recognized by the electronic device 1000.

In operation 750, the electronic device 1000 may recognize the first object included in the first image as the second object, based on a result of the comparing performed in operation 740. According to an embodiment, when the similarity between the feature values of the first and second images is greater than or equal to a reference value, the electronic device 1000 may determine that the first object of the first image is identical to the second object. Meanwhile, when the similarity between the feature values of the first and second images is smaller than the reference value, the electronic device 1000 may determine that the first object is different from the second object.

Figure 8:
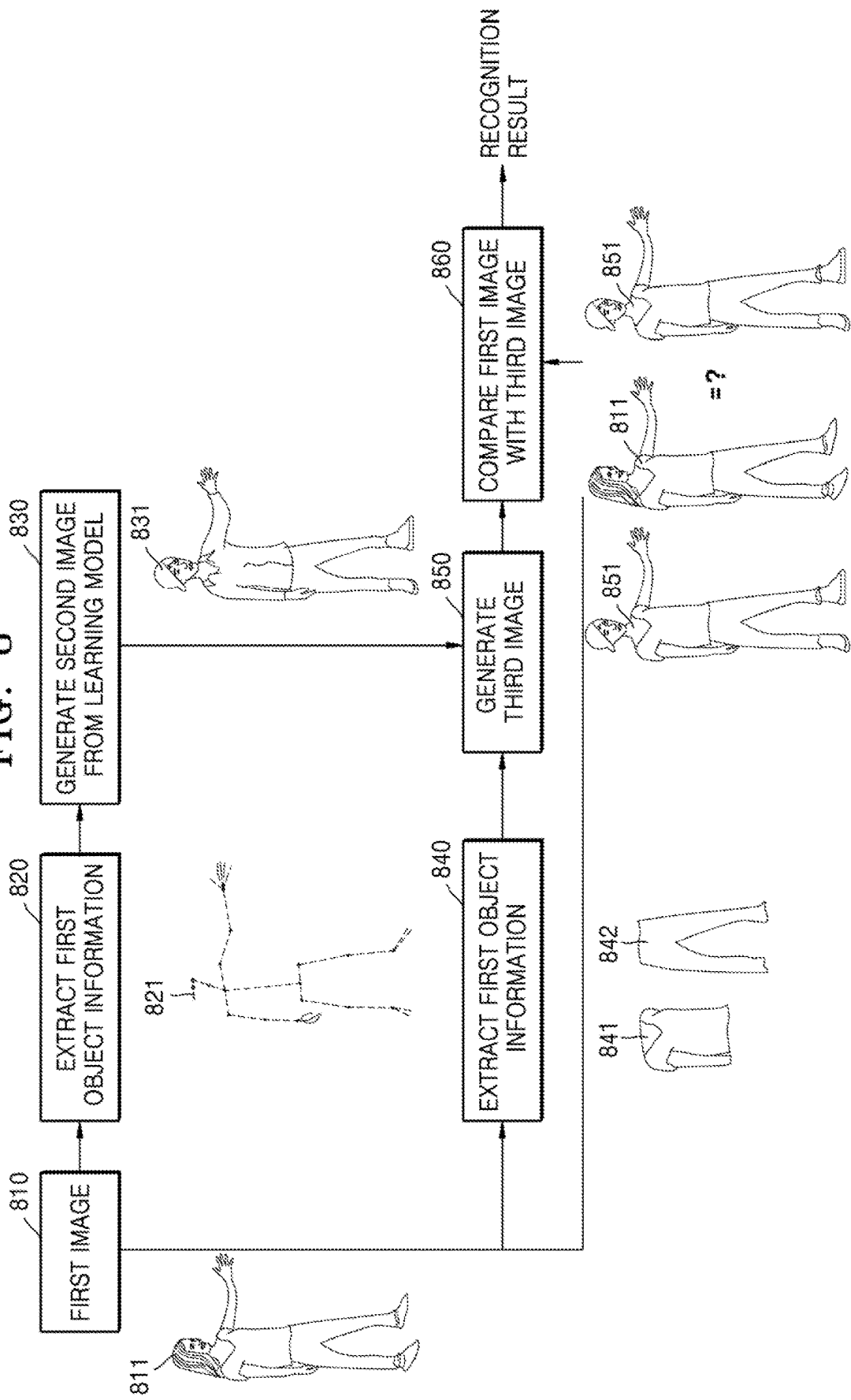
FIG. 8 illustrates a method of recognizing an object in an image, according to an embodiment, and examples of images that can be processed by using the method.

FIG. 8 illustrates a method of recognizing an object in an image, according to an embodiment, and examples of images that can be processed by the method.

Although a method of recognizing an object in an image, as illustrated in FIG. 8, corresponds to the methods illustrated in FIGS. 1, 2, and 7, the method illustrated in FIG. 8 may further include an operation of extracting second object information from a first image and an operation of generating a third image based on the second object information.

Referring to FIG. 8, in operation 810, the electronic device 1000 may obtain a first image 811 for recognizing an object. The first image 811 according to an embodiment is not limited to an example illustrated in FIG. 8, and may include various kinds of images photographed by various methods.

In operation 820, the electronic device 1000 may extract first object information 821 from the first image 811. The first object information 821 according to an embodiment may include information about outward features of an object, which may change according to various conditions.

Second object information 841 and 842 which will be described later may include information about an outward feature of an object which may change according to various conditions, like the first object information 821, and may include a different kind of information from the first object information 821. For example, the first object information 821 may include pose information, and the second object information 841 and 842 may include style information.

In operation 830, the electronic device 1000 may input the first object information 821 extracted in operation 820 to a pre-stored learning model to generate a second image 831. The second image 831 may be an image generated based on the first object information 821 and including a second object that needs to be recognized in an embodiment. Also, the second image 831 may be newly generated by using the first object information 821 extracted in operation 120, independently from the first image 811 obtained in operation 110.

The learning model may be a generative model that can generate a new image by using the first object information 821 as an input value, and the learning model may be, for example, a GAN. The learning model may be a model trained in advance based on at least one of source images including the second object and object information extracted from each source image.

Accordingly, the learning model may be generated from at least one source image including the second object, and may have been stored in advance in the electronic device 1000 before an operation of recognizing an object in an image according to an embodiment is performed.

In operation 840, the electronic device 1000 may extract second object information 841 and 842 from the first image 811. The second object information 841 and 842 may be, for example, style information, and include information about clothes which an object of the first image 811 wears.

However, the second object information 841 and 842 is not limited to an example illustrated in FIG. 8, and may include various kinds of information about changeable outward features of the object of the first image 811, except for the first object information 821.

In operation 850, the electronic device 1000 may generate a third image 851 based on the second image 831 generated in operation 830 and the second object information 841 and 842 extracted in operation 840. According to an embodiment, the electronic device 1000 may combine the second object of the second image 831 with the clothes of the second object information 841 and 842 to generate the third image 851. Therefore, according to an embodiment, information about changeable features for an object of the third image 851 may be identical or similar to information about changeable features for the object of the first image 811. For example, at least one of pose information and style information of the third image 851 may include information that is identical or similar to at least one of pose information and style information of the first image 811.

In operation 860, the electronic device 1000 may compare the first image 811 with the third image 851. According to an embodiment, the electronic device 1000 may extract one or more feature values of objects included in the first and third images, and determine a similarity between the feature values to thereby determine a similarity between the first and third images. According to an embodiment, a difference between other feature values (for example, skeletons, heights, body types, etc.) except for a pose and style of the third image 851 may have a great influence in determining a similarity between the first and third images.

Figure 9:
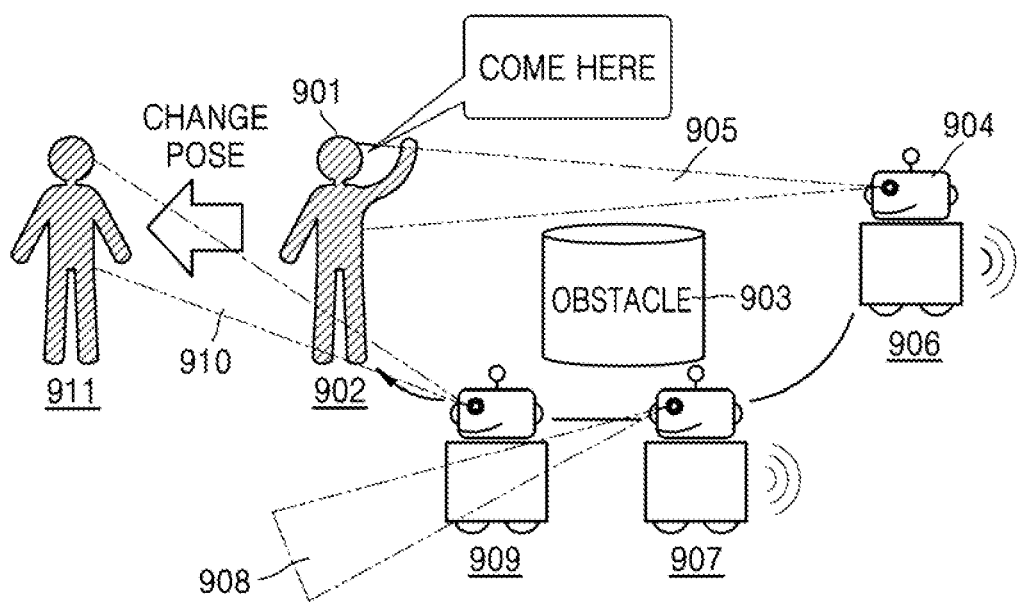
FIG. 9 illustrates an example of applying a method of recognizing an object in an image, according to an embodiment.

FIG. 9 illustrates an example of applying a method of recognizing an object in an image, according to an embodiment.

Referring to FIG. 9, when a user 901 shouts 'Come here' to call a robot 904, the robot 904 positioned at a location 906 may check a location of the user 901 who has called itself, and photograph the user 901 who has called itself (905). The robot 904 may identify the user 901, based on at least one of an image obtained by photographing (905) the user 901 and voice information about 'Come here' uttered by the user 901. However, a method, performed by the robot 904, of identifying the user 901 is not limited to the above-described example, and the robot 904 may identify who is the user 901 who has called itself among pre-registered users by various methods.

The identified user 901 may be determined to be a second object according to an embodiment.

The robot 904 may obtain a learning model for the user 901 determined to be the second object. The robot 904 may recognize the user 901 in an image which is to be photographed later by using the learning model for the user 901.

Thereafter, the robot 904 may go around an obstacle 903 and move to a location 907 in order to move to the location of the user 901 according to a command of the user 901. However, at the location 907, the robot 904 may fail to continuously photograph the user 901 because the obstacle 903 blocks a view of the robot 904. In this case, the robot 904 may pass the obstacle 903 and move to a location 909 at which the robot 904 can secure a view 910 to photograph the user 901. At this time, the user 901 may move from the location 902 to a location 911 according to the passage of time, or the user 901 may hold, at the location 911, a pose that is different from that hold at the location 902.

The robot 904 may photograph the user 901 at the location 911 to obtain an image of the user 901, and generate a second image from the photographed image based on the learning model for the user 901. The robot 904 may compare the photographed image with the second image to determine whether the user 901 photographed at the location 911 is identical to the user 901 who has called itself at the location 902.

Accordingly, the robot 904 may recognize the user 901 determined to be the second object with high accuracy, in the image photographed at the location 909, although the pose of the user 901 has changed.

Figure 10:
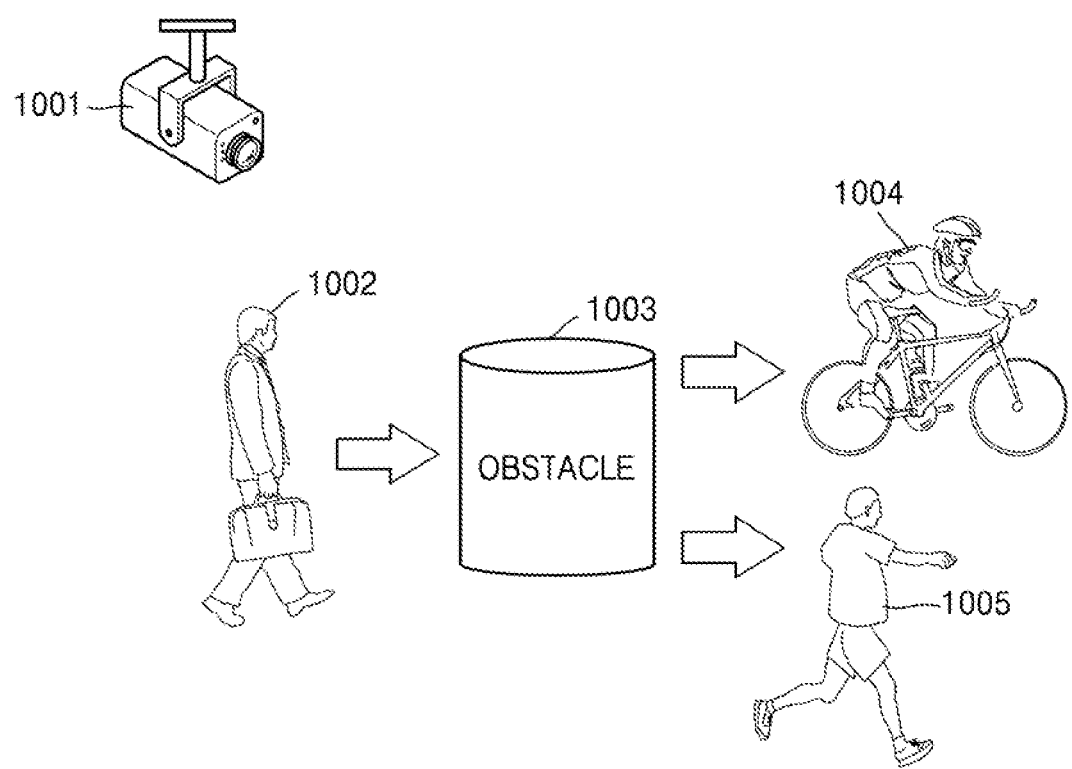
FIG. 10 illustrates an example of using a method of recognizing an object in an image, according to an embodiment.

FIG. 10 illustrates an example of applying a method of recognizing an object in an image, according to an embodiment.

Referring to FIG. 10, a system of a surveillance camera 1001 may analyze an image photographed by the surveillance camera 1001 to sense an appearance of a new person 1002. The system of the surveillance camera 1001 may identify who is the sensed person 1002 among pre-registered persons, based on pre-stored data. Also, when the system of the surveillance camera 1001 determines that the sensed person 1002 corresponds to none of the pre-registered persons, the system of the surveillance camera 1001 may register the person 1002 as a new person and then identify the registered person 1002. However, a method, performed by the system of the surveillance camera 1001, of identifying the person 1002 is not limited to the above-described example, and the system of the surveillance camera 1001 may identify the person 1002 by various methods. The identified person 1002 may be determined to be a second object according to an embodiment.

The system of the surveillance camera 1001 may obtain a learning model for the person 1002 determined to be the second object. The learning model for the person 1002 may be obtained by training at least one image including the person 1002. The system of the surveillance camera 1001 may recognize the person 1002 in an image that is to be photographed later, by using the learning model for the person 1002.

When the person 1002 passes the obstacle 1003 and moves, the surveillance camera 1001 may fail to photograph the person 1002 for a preset time due to the obstacle 1003. For the preset time, the person 1002 may wear a helmet and ride a bicycle (1004), or may change clothes and then move to another location.

The surveillance camera 1001 may photograph a state 1004 in which the person 1002 wears a helmet and rides a bicycle or a state 1005 in which the person 1002 changes clothes. The system of the surveillance camera 1001 may recognize the person 1002 determined to be the second object, from an image obtained by photographing the state 1004 in which the person 1002 wears the helmet and rides the bicycle or the state 1005 in which the person 1002 changes clothes, by using the learning model for the person 1002.

Accordingly, the system of the surveillance camera 1001 may recognize the person 1002 determined to be the second object with high accuracy, although the clothes or pose of the person 1002 has changed.

According to an embodiment, although outward features of an object included in an image change in various ways, the object may be recognized from the image with high accuracy.

An embodiment may be implemented in the form of a computer-readable recording medium including an instruction that is executable by a computer, such as a program module that is executed by a computer. The computer-readable recording medium may be an arbitrary available medium which is able to be accessed by a computer, and may include a volatile or non-volatile medium and a separable or non-separable medium. Further, the computer-readable recording medium may include a computer storage medium and a communication medium. The computer storage medium may include volatile and non-volatile media and separable and non-separable media implemented by an arbitrary method or technology for storing information such as a computer readable instruction, a data structure, a program module, or other data. The communication medium may generally include a computer readable instruction, a data structure, or a program module, and may include an arbitrary information transmission medium.

Also, in the disclosure, the terms "portion", "module", etc. may be a hardware component such as a processor or a circuit, and/or a software component that is executed by a hardware component such as a processor.

The aforementioned descriptions are only for illustrative purposes, and it will be apparent that those of ordinary skill in the art may make various modifications thereto without changing the technical spirit and essential features of the present disclosure. Thus, it should be understood that the exemplary embodiments described above are merely for illustrative purposes and not for limitation purposes in all aspects. For example, each component described as a single type may be implemented in a distributed type, and components described as distributed may be implemented in a combined form.

The scope of the present disclosure would be indicated by the claims, which will be described later, the spirit and scope of the claims, and all such modifications as would be derived from the equivalent concept intended to be included within the scope of the present disclosure.

The invention claimed is:

1. A method, performed by an electronic device, of recognizing an object included in an image, the method comprising:
    extracting first object information from a first object included in a first image, wherein the first object information includes information about a changeable outward appearance of the first object;
    obtaining a learning model for generating an image including a second object from the first object information;
    generating a second image including the second object by inputting the first object information to the learning model;
    comparing the first image with the second image; and
    recognizing the first object as the second object in the first image, based on a result of the comparing.

2. The method of claim 1, wherein the second image includes the second object having an outward appearance corresponding to the first object information.

3. The method of claim 1, wherein the first object information includes at least one of information about a pose of the first object included in the first image and information about a style of the first object in the first image.

4. The method of claim 1, wherein the comparing of the first image with the second image comprises:
    extracting second object information from the first object included in the first image;

generating a third image from the second image, based on the second object information; and comparing the first image with the third image, and wherein the second object is recognized in the first image, based on a result of the comparing of the first image with the third image.

5. The method of claim 4, wherein the first object information includes information about a pose of the first object, and the second object information includes information about a style of the first object.

6. The method of claim 1, wherein the comparing of the first image with the second image comprises:

extracting feature information about the first object and feature information about the second object from the first image and the second image; and comparing the feature information about the first object with the feature information about the second object, and wherein the second object is recognized in the first image, based on a result of the comparing of the feature information about the first object with the feature information about the second object.

7. An electronic device for recognizing an object included in an image, the electronic device comprising:

a memory storing a first image and a learning model;

at least one processor configured to extract first object information from a first object included in the first image, obtain the learning model for generating an image including a second object from the first object information, generate a second image including the second object by inputting the first object information to the learning model, compare the first image with the second image, and recognize the first object as the second object in the first image, based on a result of the comparing, wherein the first object information includes information about a changeable outward appearance of the first object; and an outputter configured to output a recognition result about the second object recognized in the first image.

8. The electronic device of claim 7, wherein the second image includes the second object having an outward appearance corresponding to the first object information.

9. The electronic device of claim 7, wherein the first object information includes at least one of information about a pose of the first object included in the first image and information about a style of the first object in the first image.

10. The electronic device of claim 7, wherein the at least one processor is further configured to extract second object information from the first object included in the first image, generate a third image from the second image, based on the second object information, and compare the first image with the third image, and wherein the second object is recognized in the first image, based on a result of the comparing of the first image with the third image.

11. The electronic device of claim 10, wherein the first object information includes information about a pose of the first object, and the second object information includes information about a style of the first object.

12. The electronic device of claim 7, wherein the at least one processor is further configured to extract feature information about the first object and feature information about the second object from the first image and the second image, and compare the feature information about the first object with the feature information about the second object, and wherein the second object is recognized in the first image, based on a result of the comparing of the feature information about the first object with the feature information about the second object.

13. A non-transitory computer-readable recording medium storing a program for implementing the method according to claim 1.

14. The method of claim 1, wherein the obtaining of the learning model comprises:

obtaining a plurality of images of the second object, the plurality of images including poses of the second object, and generating the learning model based on information about the poses of the second object.

15. The method of claim 14, wherein the poses of the second object in the plurality of images are different from each other.

16. The electronic device of claim 7, wherein the at least one processor is further configured to:

obtain a plurality of images of the second object, the plurality of images including poses of the second object, and generate the learning model based on information about the poses of the second object.

17. The electronic device of claim 16, wherein the poses of the second object in the plurality of images are different from each other.

* * * * *